United States Patent
Appelman

(10) Patent No.: US 8,762,855 B2
(45) Date of Patent: *Jun. 24, 2014

(54) USER DEFINABLE ON-LINE CO-USER LISTS

(71) Applicant: Facebook, Inc., Menlo Park, CA (US)

(72) Inventor: Barry Appelman, Great Falls, VA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,071

(22) Filed: Dec. 18, 2012

(65) Prior Publication Data

US 2013/0110933 A1 May 2, 2013

Related U.S. Application Data

(63) Continuation of application No. 13/347,277, filed on Jan. 10, 2012, which is a continuation of application No. 12/469,347, filed on May 20, 2009, now Pat. No. 8,099,667, which is a continuation of application No. 10/866,304, filed on Jun. 14, 2004, now Pat. No. 7,539,942, which is a continuation of application No. 08/803,692, filed on Feb. 24, 1997, now Pat. No. 6,750,881.

(51) Int. Cl.
*G06F 13/00* (2006.01)
*G06F 15/00* (2006.01)
*H04L 12/58* (2006.01)

(52) U.S. Cl.
CPC .............. *H04L 51/10* (2013.01); *H04L 51/04* (2013.01)
USPC .......................................... 715/733; 715/853

(58) Field of Classification Search
CPC ................................ H04L 51/10; H04L 51/04
USPC ......... 715/733, 853, 758, 750, 743, 736–737, 715/751–753, 749, 744, 765
See application file for complete search history.

(56) References Cited

U.S. PATENT DOCUMENTS

| 4,653,090 A | 3/1987 | Hayden |
| 5,136,501 A | 8/1992 | Silverman et al. |

(Continued)

FOREIGN PATENT DOCUMENTS

| WO | WO 97/14234 | 4/1997 |
| WO | WO 97/46955 | 12/1997 |

OTHER PUBLICATIONS

"Hey Baby, Call Me at My IP Address"; Peter Wayner; BYTE Magazine; Apr. 1996.

(Continued)

*Primary Examiner* — Kevin Nguyen
(74) *Attorney, Agent, or Firm* — Keller Jolley Preece

(57) ABSTRACT

A real time notification system that tracks, for each user, the logon status of selected co-users of an on-line or network system and displays that information in real time to the tracking user in a unique graphical interface. The invention provides user definable on-line co-user lists, or "buddy lists", that track specific co-users in real-time automatically. A user can create many separate buddy lists of co-users, either with intersecting or disjoint lists of users, and label these buddy lists according to the user's preference. The user can update a buddy list or create new buddy lists whenever necessary. When a user logs on to a system, the user's set of buddy lists is presented to the buddy list system. The buddy list system attempts to match co-users currently logged into the system with the entries on the user's buddy list. Any matches are displayed to the user. As co-users logon and logoff, a user's buddy list is updated to reflect these changes. An indication can also be added to show that a co-user just logged on or just left the system.

14 Claims, 7 Drawing Sheets

(56) References Cited

U.S. PATENT DOCUMENTS

| | | | |
|---|---|---|---|
| 5,245,656 | A | 9/1993 | Loeb et al. |
| 5,276,736 | A | 1/1994 | Chaum |
| 5,327,486 | A | 7/1994 | Wolff et al. |
| 5,347,306 | A | 9/1994 | Nitta |
| 5,471,525 | A | 11/1995 | Domoto et al. |
| 5,483,586 | A | 1/1996 | Sussman |
| 5,506,891 | A | 4/1996 | Brown |
| 5,533,110 | A | 7/1996 | Pinard et al. |
| 5,557,659 | A | 9/1996 | Hyde-Thomson |
| 5,568,540 | A | 10/1996 | Greco et al. |
| 5,583,920 | A | 12/1996 | Wheeler, Jr. |
| 5,588,107 | A | 12/1996 | Bowden et al. |
| 5,592,534 | A | 1/1997 | Ito |
| 5,608,786 | A | 3/1997 | Gordon |
| 5,610,910 | A | 3/1997 | Focsaneanu et al. |
| 5,644,657 | A | 7/1997 | Capps et al. |
| 5,652,789 | A | 7/1997 | Miner et al. |
| 5,689,662 | A | 11/1997 | Nakajima et al. |
| 5,726,984 | A | 3/1998 | Kubler et al. |
| 5,742,905 | A | 4/1998 | Pepe et al. |
| 5,752,025 | A | 5/1998 | Shakib et al. |
| 5,774,668 | A | 6/1998 | Choquier et al. |
| 5,790,548 | A | 8/1998 | Sistanizadeh et al. |
| 5,793,365 | A * | 8/1998 | Tang et al. ............ 715/758 |
| 5,796,395 | A | 8/1998 | de Hond |
| 5,805,164 | A | 9/1998 | Blum et al. |
| 5,812,773 | A | 9/1998 | Norin |
| 5,835,087 | A | 11/1998 | Herz et al. |
| 5,862,203 | A | 1/1999 | Wulkan et al. |
| 5,864,874 | A | 1/1999 | Shapiro |
| 5,880,731 | A | 3/1999 | Liles et al. |
| 5,892,764 | A | 4/1999 | Riemann et al. |
| 5,892,856 | A | 4/1999 | Cooper et al. |
| 5,956,485 | A | 9/1999 | Perlman |
| 5,960,173 | A * | 9/1999 | Tang et al. ............ 709/201 |
| 5,978,672 | A | 11/1999 | Hartmaier et al. |
| 6,052,372 | A | 4/2000 | Gittins et al. |
| 6,104,711 | A | 8/2000 | Voit |
| 6,108,704 | A | 8/2000 | Hutton et al. |
| 6,144,848 | A | 11/2000 | Walsh et al. |
| 6,389,127 | B1 | 5/2002 | Vardi et al. |
| 6,448,978 | B1 | 9/2002 | Salvador et al. |
| 6,449,344 | B1 | 9/2002 | Goldfinger et al. |
| 6,677,968 | B1 | 1/2004 | Appelman |
| 6,750,881 | B1 | 6/2004 | Appelman |
| 7,454,709 | B1 | 11/2008 | Appelman |
| 7,539,942 | B1 | 5/2009 | Appelman |
| 8,099,667 | B1 | 1/2012 | Appelman |
| 8,584,017 | B2 | 11/2013 | Appelman |
| 8,584,018 | B2 | 11/2013 | Appelman |
| 2013/0091434 | A1 | 4/2013 | Appelman |
| 2013/0091438 | A1 | 4/2013 | Appelman |
| 2013/0110858 | A1 | 5/2013 | Appelman |
| 2013/0111608 | A1 | 5/2013 | Appelman |
| 2013/0117690 | A1 | 5/2013 | Appelman |

OTHER PUBLICATIONS

Sharon Belville et al., Zephyr at CERN, Jul. 15, 1993, [online], [retrieved on Jan. 27, 2003]. Retrieved from the Internet: URL:http://consult.cern.ch/writeup/zephyr/main.html.
"Dial 1-800-Internet"; Nathan Muller; BYTE Magazine; Feb. 1996.
"Tomorrow's TV Today," Netwatch, Time Magazine, Oct. 10, 1994.
Abbe Cohen et al., Inessential Zephyr, [online], [retrieved on Jan. 28, 2003]. Retrieved from the Internet: URL:http://www.mit.edu/afs/sipb/project/dochzephyr/html/izephyr.html.
Ackerman et al., "Social Activity Indicators: Interface Components for CSCW Systems", Nov. 1995.
Angwin, 'Talk is cheap: buddy lists spark race to harness the power of 'presence", The Wall Street Journal, Mar. 23, 2001.
AOL 1996 Annual Report.
Arndt, "PowWow: Voice Chat with a Difference!" SIXTEEN BITS, Jan. 1997.
Beckley et al., "Eudora Version 3.0 for Windows User Manual", Oct. 1996.
C. Anthony DellaFera et al., the Zephyr Notification Service, pp. 1-9.
Carla J. Fermann, Distributed Consulting in a Distributed Environment, ACM SIGUCCS XVIII 1990, pp. 117-120.
Cotton, Kali95 Help Files, 1996.
CUSeeMe Activity, http://web.cortland.edu/flteach/methods/obj2/cueeme2.html, retrieved Mar. 18, 2013.
Dorcey, "CU-SeeMe Desktop VideoConferencing Software" 1995.
Dourish et al., "Awareness and Coordination in Shared Workspaces" 1992.
Earll M. Murman et al., Perspectives on Project Athena, ACM SIGUCCS SVIII 1990, pp. 287-296.
Edward Baig, How to Practice Safe Surfing, Business Week, Sep. 9, 1996, p. 120.
Finding Several Users, Jul. 14, 1994, [online], [retrieved on Jan. 27, 2003]. Retrieved from the Internet: URL:http://consult.cern.ch/writeuphephyr/subsectionstar2_2_3_2.html.
Gajewska et al., "Argohalls: Adding Support for Group Awareness to the Argo Telecollaboration System", 1995.
Gedney et al., Eudora for Macintosh Version 3.0, User Manual, 1996.
Goldfinger et al., ICQ Help Files, Nov. 1996.
Greenberg, "It should have been my idea," 31, 3 Computerworld, Jan. 20, 1997.
Hunt, "3DO Delivers First Entertainment Product for the Internet; Meridian 59 Is World's First Internet 3-D Graphical MUD Game Netscape Navigator" Sep. 17, 1996.
Hunt, 3DO Reports Profitable Second Quarter Results; Revenues Up to $26.8 Million.
Installing Cornell CU-SeeMe version 1.0a, http://hoople_ny.tripod.com/cornell.htm, May 29, 2003.
Internet Archive—Only on AOL: Interactivity, http://web.archive.org/web/19961220155908/http://www.aol.com/only/interactivity.html, Oct. 1996.
Invalidity Contention, U.S. District Court Northern District of California (Oakland Division), Civil Case No. 4:12-cv-04230-PJH, Feb. 15, 2013, 23 pages.
Invalidity Contention, U.S. District Court Northern District of California (Oakland Division), Civil Case No. 4:12-cv-04230-PJH, Feb. 15, 2013, Exhibit A-1, 405 pages.
Invalidity Contention, U.S. District Court Northern District of California (Oakland Division), Civil Case No. 4:12-cv-04230-PJH, Feb. 15, 2013, Exhibit A-2, 417 pages.
Invalidity Contention, U.S. District Court Northern District of California (Oakland Division), Civil Case No. 4:12-cv-04230-PJH, Feb. 15, 2013, Exhibit A-3, 441 pages.
Invalidity Contention, U.S. District Court Northern District of California (Oakland Division), Civil Case No. 4:12-cv-04230-PJH, Feb. 15, 2013, Exhibit A-4, 427 pages.
Invalidity Contention, U.S. District Court Northern District of California (Oakland Division), Civil Case No. 4:12-cv-04230-PJH, Feb. 15, 2013, Exhibit A-5, 435 pages.
Invalidity Contention, U.S. District Court Northern District of California (Oakland Division), Civil Case No. 4:12-cv-04230-PJH, Feb. 15, 2013, Exhibit A-6, 417 pages.
Keizer, Gregg, "Comprehensive Collaboration Comes Cheap", CNET Reviews NetMeeting 1.0 Beta 1, Jul. 16, 1996, http://www.cnet.com, pp. 1-2.
Kirmse, History of Meridian 59, 1994-2000, http://www.meridian59.com/about-early-history.php, May 2000.
Kohler, Xzewd Help, http://web.mit.edu/outland/share/lib/xzewd/help/.
Kohler, Xzewd Manual Pages, Nov. 21, 1992.
Loevstrand, "Being Selectively Aware with the Khronika System" 1991.
Mardam-Bey, mIRC v3.92 Help Files, 1996.
Mark Moridian, Internet Online Services: Communication, Interactive Content, v2, p. 7, Oct. 1996.
O'Hara, Meridian 59 User's Guide, Jan. 27, 1997.
Patterson, "Notification Servers for Synchronous Groupware", 1996.
Robert S. French et al., The Zephyr Programmer's Manual, Protocol Version ZEPH0.2, Apr. 5, 1989, pp. 1-82.
Root, "Design of a Multi-Media Vehicle for Social Browsing" 1988.

(56) References Cited

OTHER PUBLICATIONS

Schmeidler, Xzul Manual Pages, Sep. 1, 1996.
Sellers, "ANNOUNCE: *FREE* 3D Graphical MUD Available 1/15" Article <4adch9$3b4@kellyteleport.com>#1/1 in Usenet newsgroup rec.games.rpg, Dec. 9, 1995.
Sohlenkamp et al., "Integrating Communication, Cooperation, and Awareness: The DIVA Virtual Office Enviroment", 1994.
Xhtalk 2.9 Specification; Klaus Hartenstein; Nov. 92.
Zephyr Answers, [online], [retrieved on Jan. 27, 2003]. Retrieved from the Internet: Url:http://web.mit.edu/answers/zephyr/.
Zephyr on Athena (AC-34) Draft, [online], [retrieved on Jan. 27, 2003]. Retrieved from the Internet: URL:http://web.mit.edu/olh/zephyr/TOC.html.
Zephyr(1) Manual Page, Jul. 1, 1988, [online], [retrieved on Jan. 27, 2003]. Retrieved from the Internet: URL:http://www.tru64unix.compaq.com/demos/ossc-v51a/man-htm/zephyr-man.htm.
U.S. Appl. No. 10/866,304, Mar. 30, 2007, Office Action.
U.S. Appl. No. 10/866,304, Dec. 27, 2007, Office Action.
U.S. Appl. No. 10/866,304, Jul. 21, 2008, Office Action.
U.S. Appl. No. 10/866,304, Jan. 14, 2009, Notice of Allowance.
U.S. Appl. No. 10/703,663, Jun. 20, 2007, Office Action.
U.S. Appl. No. 10/703,663, Dec. 27, 2007, Office Action.
U.S. Appl. No. 10/703,663, Apr. 25, 2008, Notice of Allowance.
U.S. Appl. No. 10/703,663, Oct. 16, 2008, Supplemental Notice of Allowability.
U.S. Appl. No. 12/469,347, Apr. 11, 2011, Office Action.
U.S. Appl. No. 12/469,347, Sep. 13, 2011, Notice of Allowance.
U.S. Appl. No. 13/347,277, Jul. 5, 2012, Office Action.
U.S. Appl. No. 13/347,277, Nov. 28, 2012, Office Action.
U.S. Appl. No. 13/347,277, Jul. 5, 2013, Office Action.
U.S. Appl. No. 13/347,277, Sep. 18, 2013, Notice of Allowance.
U.S. Appl. No. 13/615,148, Mar. 5, 2013, Office Action.
U.S. Appl. No. 13/615,148, Sep. 24, 2013, Notice of Allowance.
U.S. Appl. No. 13/615,148, Oct. 16, 2013, Notice of Allowance.
U.S. Appl. No. 13/615,157, Jul. 17, 2013, Office Action.
U.S. Appl. No. 13/720,250, Aug. 1, 2013, Office Action.
U.S. Appl. No. 13/720,250, Sep. 16, 2013, Notice of Allowance.
U.S. Appl. No. 13/720,528, Sep. 12, 2013, Office Action.
U.S. Appl. No. 13/720,528, Oct. 28, 2013, Notice of Allowance.
U.S. Appl. No. 13/720,295, Oct. 4, 2013, Office Action.
U.S. Appl. No. 13/720,295, Dec. 23, 2013, Notice of Allowance.

* cited by examiner

FIG. 7

Member Directory Create or Modify Your Profile | *My* Profile

Quick Search | Advanced Search
Search entire profile for the following

Optional Fields:
Member Name    Location (city/state)

[Search]  [Help & Info]   ☐ Return only members online

FIG. 7

Locate Member Online

Enter the member's screen name to find out what area of the service he or she is currently using.

USER DEFINABLE ON-LINE CO-USER LISTS

CROSS REFERENCE TO RELATED APPLICATIONS

This application is a continuation of Ser. No. 13/347,277 filed Jan. 10, 2012, which is a continuation of U.S. patent application Ser. No. 12/469,347, filed May 20, 2009, now U.S. Pat. No. 8,099,667, which is a continuation of U.S. patent application Ser. No. 10/866,304, filed Jun. 14, 2004, now U.S. Pat. No. 7,539,942, which is a continuation of U.S. patent application Ser. No. 08/803,692, filed Feb. 24, 1997, now U.S. Pat. No. 6,750,881. Each of the aforementioned applications and patents are hereby incorporated by reference in their entirety.

BACKGROUND

1. Field of the Invention

This invention relates to on-line communication networks, and particularly to interpersonal communications on such networks.

2. Description of Related Art

An important aspect of an "online" system, such as the proprietary system operated by America Online, Inc, (AOL) or the public Internet system, is knowledge of the people/users/processes on that system and a methodology for communicating with them through some selected protocol. When a person "logs on" to a network system, they are in effect identifying themselves to the system and announcing their presence. On most systems, this presence is unique to every user who is on the system. For example, on the AOL network this presence is known as the "screen name", but on other systems it could be an Internet Protocol (IP) address or some other unique identifier.

An Internet Service Provider (ISP) is, in a sense, an online system because every user has an associated IP network address and may also have a user id and password. There can also be a hierarchy of logon systems, where an ISP is used to connect to a first network, and then once connected the user can log on to another system with a different identity. These secondary systems can be in parallel (i.e., a user connects to an ISP and then logs on to multiple systems), or a combination of parallel and hierarchical (i.e., a user logs on to multiple systems in parallel once connected to the ISP, and then from one of those parallel systems logs on to yet other systems. Thousands to millions of users may be accessing such complex networks at any point in time.

A problem with networks on any size is tracking personal relationships and maintaining knowledge of the people/users/processes on that system. In the AOL network, a user could use a LOCATE function to inquire from the system if another user was currently logged into the system. In the CompuServe network, a user can use a more limited "WHO'S HERE" function to determine who is present in a forum conference.

The present invention addresses the problem of tracking personal relationships and maintaining knowledge of the people/users/processes on that system with a unique way of establishing and maintaining user definable on-line co-user lists.

SUMMARY

The invention implements a real time notification system that tracks, for each user, the logon status of selected co-users of an on-line or network system and displays that information in real time to the tracking user in a unique graphical interface. The invention provides user definable on-line co-user lists, or "buddy lists", that track specific co-users in real-time automatically.

A user can create many separate buddy lists of co-users, either with intersecting or disjoint lists of users, and label these buddy lists according to the user's preference. The user can update a buddy list or create new buddy lists whenever necessary. When a user logs on to a system, the user's set of buddy lists is presented to the buddy list system. The buddy list system attempts to match co-users currently logged into the system with the entries on the user's buddy list. Any matches are displayed to the user. As co-users logon and logoff, a user's buddy list is updated to reflect these changes. An indication can also be added to show that a co-user just logged on or just left the system.

The details of the preferred embodiment of the present invention are set forth in the accompanying drawings and the description below. Once the details of the invention are known, numerous additional innovations and changes will become obvious to one skilled in the art.

DESCRIPTION OF DRAWINGS

FIG. 7 is a graphical display of one implementation of the invention, showing a search member directory window.

FIG. 8 is a graphical display of one implementation of the invention, showing a member location window.

Like reference numbers and designations in the various drawings indicate like elements.

DETAILED DESCRIPTION

Throughout this description, the preferred embodiment and examples shown should be considered as exemplars, rather than as limitations on the present invention.

Overview

The invention implements a real time notification system that tracks, for each user, the logon status of selected co-users and displays that information in real time to the tracking user in a unique graphical interface. The invention provides user definable on-line co-user lists, or "buddy lists", that track specific co-users in real-time automatically. Such automatic monitoring is significant, because in a system of any size there would be no way for a user to track the comings and goings of thousands or millions of users each moment in time.

An important component of the buddy list system is that a user can create many separate buddy lists of co-users, either with intersecting or disjoint lists of co-users, and label these buddy lists according to the user's preference. The user can update a buddy list or create new buddy lists whenever necessary. When a user logs on to a system, the user's set of buddy lists is presented to the buddy list system. The buddy list system attempts to match co-users currently logged into the system with the entries on the user's buddy list. Any matches are displayed to the user. As co-users logon and logoff, a user's buddy list is updated in real-time (or near real-time, taking into account network and processing delays) to reflect these changes. An indication can also be added to show that a co-user just logged on or just left the system.

Hardware System

Figure 1:
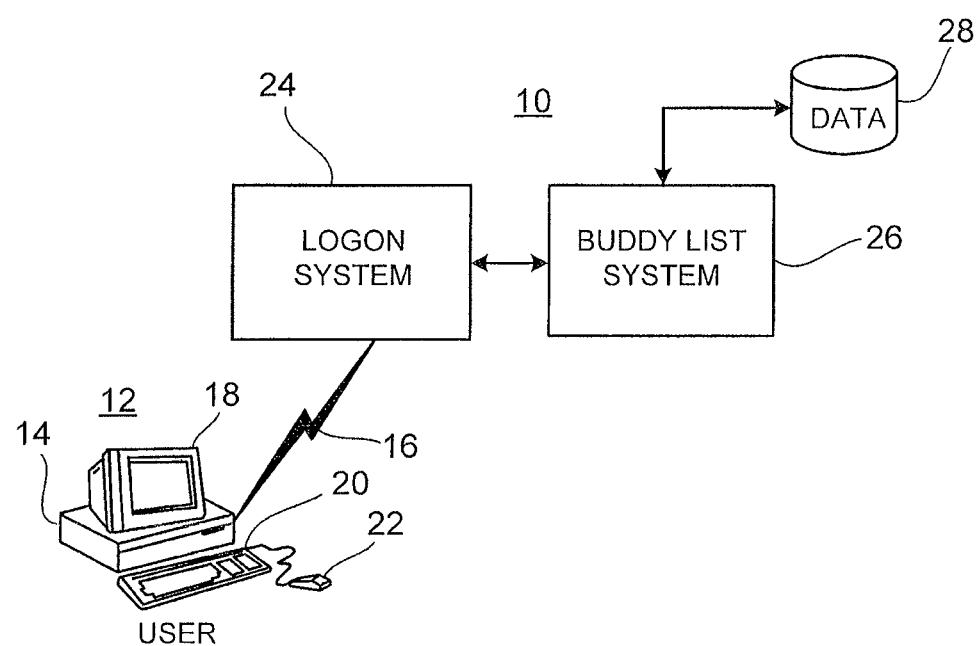
FIG. 1 is a block diagram of a typical network system 10 in which the invention can be implemented.

By way of example only. FIG. 1 is a block diagram of a typical network system 10 in which the invention can be implemented. The network system 10 includes a plurality of user stations 12 that preferably include a processor chassis 14 having a network link. The network link is for receiving and transmitting data in analog or digital form over a communications link 16, such as a serial link, local area network, wireless link, parallel link, etc. Also coupled to a typical processor chassis 14 is a display 18, a keyboard 20, and a pointing device 22 (e.g., a mouse).

The communications link 16 couples each user station 12 as a "client" to a logon system 24, which is typically a software program executing on a remote server somewhere on a network. The logon system 24 communicates with a "Buddy List System" 26, which is preferably a software program executing on a server somewhere on the network. The Buddy List. System 26 maintains a database 28 for storing user information. The database 28 may be of any type, such as relational or hierarchical, and may be centralized or distributed. For example, the database 28 may be stored at least in part on each user's own station 12. In such a case, the database 28 contents would be transmitted to the Buddy List System 26 when the user logged into the system.

Data Structure

Figure 2A:
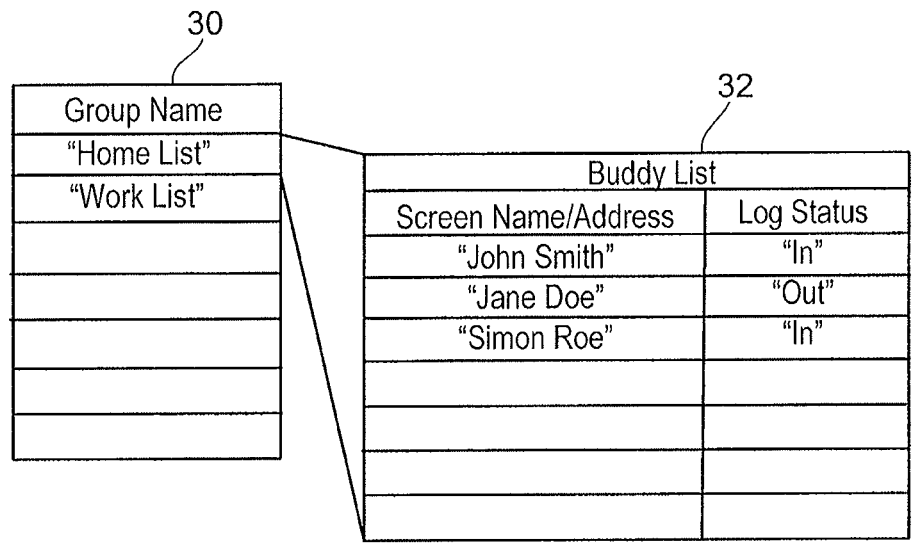
FIG. 2a is a set of symbolic data records showing the basic types of data used by one embodiment of the invention for a buddy list, and the conceptual relationship of data elements.

FIG. 2a is a set of symbolic data records showing the basic types of data used by the Buddy List System 26, and the conceptual relationship of data elements. A Group Name table 30 stores user-defined group names for buddy lists. Each user may define multiple buddy lists by group names (two being shown by way of example). Each group name in the Group Name table 30 has an associated Buddy List table 32, comprising multiple records. Each Buddy List table 32 record corresponds to a co-user ("buddy") that the user wishes to track. In the preferred embodiment, the record includes data elements for the screen name (or address, such as an Internet address) of a particular co-user to be tracked, and the logon status of that user (e.g., codes for "In" or "Out").

Figure 2B:
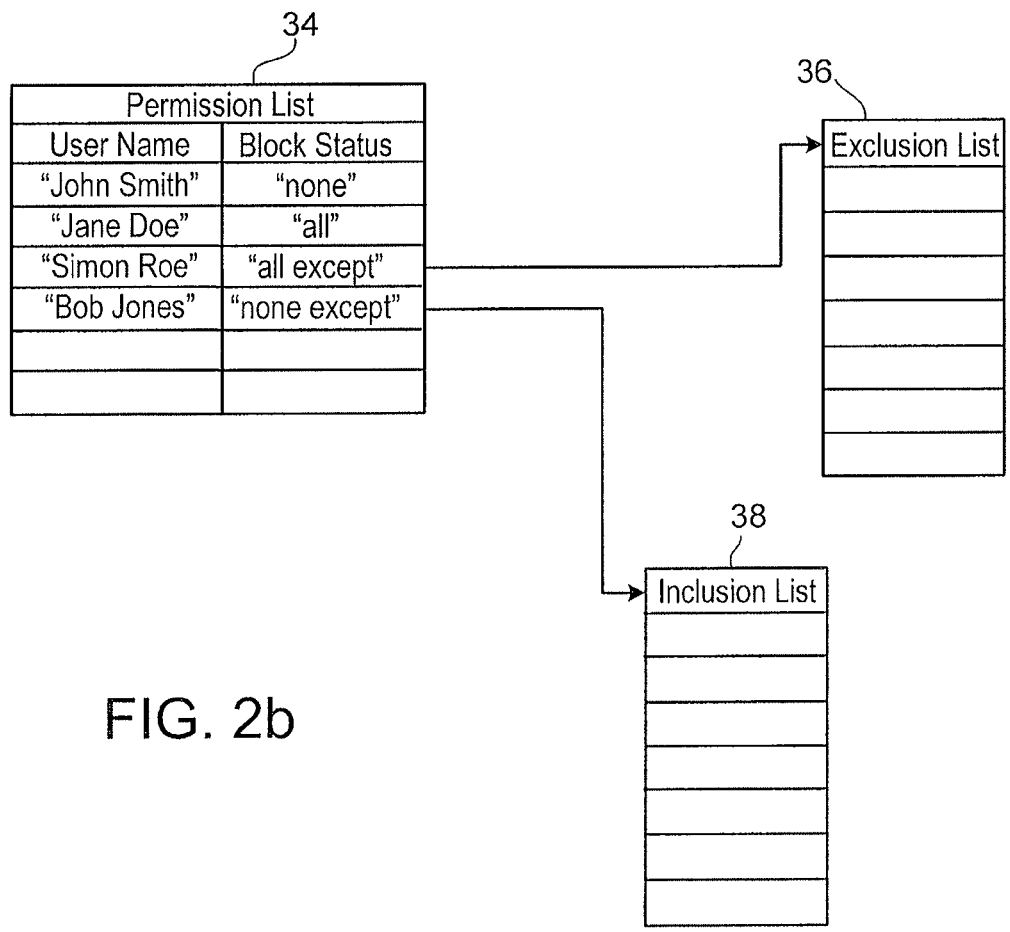
FIG. 2b is a set of symbolic data records showing the basic types of data used by one embodiment of the invention for a permissions list, and the conceptual relationship of data elements.

FIG. 2b is a set of symbolic data records showing the basic types of data used by one embodiment of the invention for a Permissions List 34, and the conceptual relationship of data elements. Each user in the system has an associated Block Status code. If a user's Block Status code is equivalent to "none", then no co-user may enter that user into the co-user's buddy lists. If a user's Block Status code is equivalent to "all", then all co-users may enter that user into their buddy lists. If a user's Block Status code is equivalent to "all except", then all co-users except those entered in a linked Exclusion List 36 may enter that user into their buddy lists. If a user's Block Status code is equivalent to "none except", then only co-users entered in a linked Inclusion List 38 may enter that user into the co-user's buddy lists. In one embodiment, a user may only have one of an inclusion List 36 and an Exclusion List 48.

Example Implementation

Figure 3:
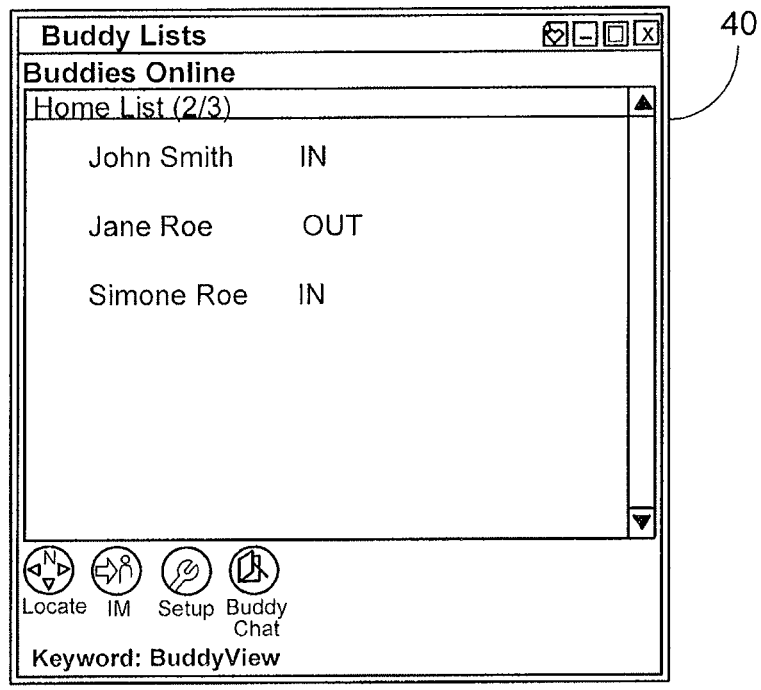
FIG. 3 is a graphical display of one implementation of the invention, showing a buddy list window.

FIG. 3 is a graphical display of one implementation of the invention, showing a Buddy List window 40 with a buddy list named "Home List" in a large scrollable area. Buddy list names are like categories. Other buddy lists can be shown in the same display. Indented underneath each buddy list are the names (or addresses) of user-selected co-users comprising that list. In the example shown, the "Home List" includes three co-users and their status as "IN" (i.e., currently logged into the system) or "OUT" (i.e., currently logged out of the system). Any desired method or technique cart be used to indicate log status, such as distinct attributes (e.g., bolding a name to indicate logged in, graying a name to indicated logged out) or other symbols (e.g., checkmarks to indicate logged in), etc. In still another embodiment, only logged in members of a buddy list are displayed. In one embodiment, an asterisk or other symbol appears next to the screen name of the most recent co-user to log into the system, and parentheses are placed around the screen name of the most recent co-user to log out of the system.

In the preferred embodiment, a user can "minimize" a buddy list to suppress display of all the co-users in that group. This is preferably implemented so that a double click on the buddy list name will cause all the screen names listed beneath to disappear. In the preferred embodiment, minimized buddy lists are indicated by a "+" symbol next to the buddy list name. Double-clicking on the buddy list name again displays all of the hidden co-users under that name. A user can also keep tabs on each list by checking out the numbers posted in parenthesis next to the buddy list names. This number tells the user how many people on that list are logged in out of the total number of screen names on the buddy list. In the illustrated example, ⅔ means that two of the three people on the "Home List" are currently online.

In the preferred embodiment, when the user first logs into the system, the Buddy List window 40 opens, informing the user which of the user's buddy list members are currently online. The user can either close this window, or leave it open while visiting other areas of the system. If the Buddy List window 40 is left open, the user has a current, real-time list of all the user's buddies in who are online at any particular moment.

The illustrated Buddy List window 40 shows a number of buttons for setting up or using buddy lists. Included buttons in the preferred embodiment are: LOCATE, for determining which "chat room" a buddy is in at a particular moment; IM, for sending an "Instant Message"; SETUP, for creating and editing buddy lists or setting buddy list preferences; and BUDDY CHAT, for inviting buddies to a private chat or a favorite place in the system.

Setup

Figure 4:
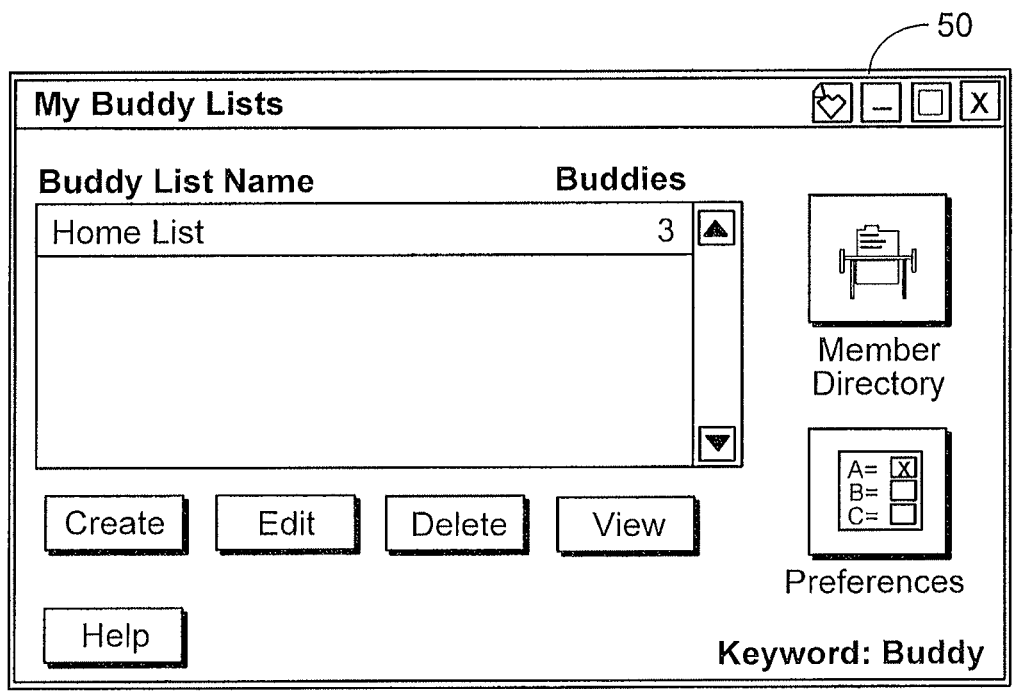
FIG. 4 is a graphical display of one implementation of the invention, showing a buddy list setup window.

FIG. 4 is a graphical display of one implementation of the invention, showing a Buddy List Setup window 50 with a buddy list named "Home List" in a scrollable area. Buttons are provided for creating a new buddy list; editing a selected buddy list; deleting a buddy list; viewing the members of a selected buddy list; accessing a Member Directory for the system; and accessing a preferences windows. In the preferred embodiment, each buddy list is shown in the scrollable area with a count of the number of co-users in each list.

Figures 5, 6:
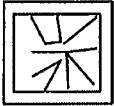
FIG. 5 is a graphical display of one implementation of the invention, showing a buddy list create window.
FIG. 6 is a graphical display of one implementation of the invention, showing a buddy list preferences window.

FIG. 5 is a graphical display of one implementation of the invention, showing a Buddy List Create window 60. A user can enter a buddy list group name and a screen name for each co-user to be tracked. A list of buddies on a particular list are also displayed, along with a button allowing removal of an existing buddy. After entry of all necessary data in such a window, the user's Group Name table 30 and the appropriate Buddy List table 32 are updated using conventional data processing techniques. Editing a buddy list can be done from the same or a similar window.

FIG. 6 is a graphical display of one implementation of the invention, showing a Buddy List Preferences window 70. In the preferred embodiment, these Preferences include the following:

- Show me my Buddy List(s) immediately after I sign onto AOL. This option opens the Buddy List window 40 (FIG. 3) when the user logs on to the system.
- Play sound when buddies sign-on. This option enables a sound to play when one of the co-users on a user's buddy list program logs on ("BuddyIn").
- Play sound when buddies sign-off. This option enables a sound to play when one of the co-users on a user's buddy list program logs off ("BuddyOut").
- Allow all members to add me to their lists/invitations. This option grants permission for all co-users to add the user to their buddy lists and send the user "Buddy Chat Invitations" and other information. If set, the appropriate user record in the Permissions List table 34 is marked with a code for "all" in the Block Status field.
- Block all members from adding me to their lists/invitations. This option restricts all co-users from adding the user to their buddy lists and from sending the user "Buddy Chat Invitations" and other information. If set, the appropriate user record in the Permissions List table 34 is marked with a code for "none" in the Block Status field.
- Allow only the members below. This option restricts all members from adding the user to their buddy lists and from sending the user "Buddy Chat Invitations" and other information, except for those co-users specifically listed where provided in the window. If set, the appropriate user record in the Permissions List table 34 is marked with a code for "none except" in the Block Status field, and an Inclusion List 38 is linked to the user for storing the names of included co-users.
- Block only the members below. This option grants permission for all other members to add the user to their buddy lists and send the user "Buddy Chat Invitations" and other information, except for those co-users specifically listed where provided in the window. If set, the appropriate user record in the Permissions List table 34 is marked with a code for "all except" in the Block Status field, and an Exclusion List 36 is linked to the user for storing the names of excluded co-users.
- Sound Library. Allows a user to select sound events for "BuddyIn" and "BuddyOut".

In the preferred embodiment, the Inclusion List 38 and the Exclusion List 36 options are mutually exclusive. In this way, a user can control who sees the user logging on and off the system. Although the user can be placed on the buddy list of a co-user, if the user blocks visibility through the use of these controls, the co-user does not see the logon/logoff status of that user.

FIG. 7 is a graphical display of one implementation of the invention, showing a Search Member Directory window 80. In the preferred embodiment, this feature is accessed from the Buddy List Setup window 50 (FIG. 4), and allows searching a system directory in known fashion for screen names or addresses of co-users, for entry into buddy lists.

Locate

FIG. 8 is a graphical display of one implementation of the invention, showing a member location window 90. In the preferred embodiment, this feature is accessed from the Buddy List window 40 (FIG. 3). Selecting a co-user's name from a buddy list and activating the LOCATE button will cause the system to determine whether the selected co-user is in a chat area or not. If no co-user is selected and the LOCATE button is activated, a member location window 90 is displayed with the input field blank, for entry of a co-user name. This feature using the existing locate functions of the system.

Instant Messages

Figure 9:
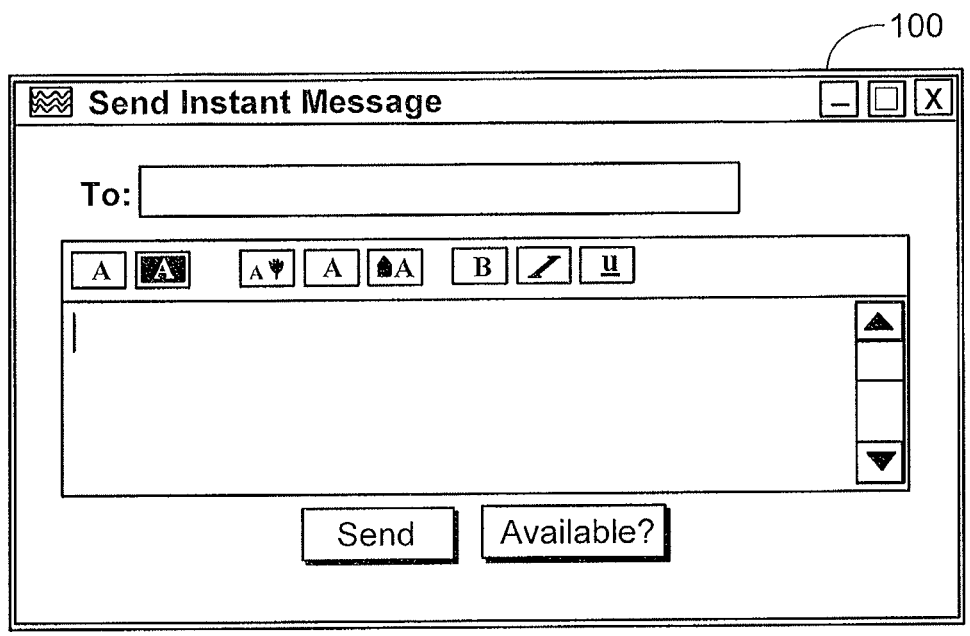
FIG. 9 is a graphical display of one implementation of the invention, showing an instant message window.

Once a co-user is displayed on a user's buddy list, indicating that the co-user is currently logged into the network system, the preferred embodiment of the invention enables a simple way of communicating with that co-user. FIG. 9 is a graphical display of one implementation of the invention, showing an Instant Message window 100. In the preferred embodiment, the Instant Message window is automatically displayed by activating (e.g., by clicking or double clicking) a co-user's name on a buddy list. The "To:" line of the window is pre-filled with the selected co-user's name and the cursor is positioned in the text entry area ready for text to be typed to be sent to the targeted co-user. The Instant Message function can also be activated by highlighting a co-user name in the buddy list and clicking on the IM button in the Buddy List window 40 (FIG. 3).

Buddy Chat

Figure 10:
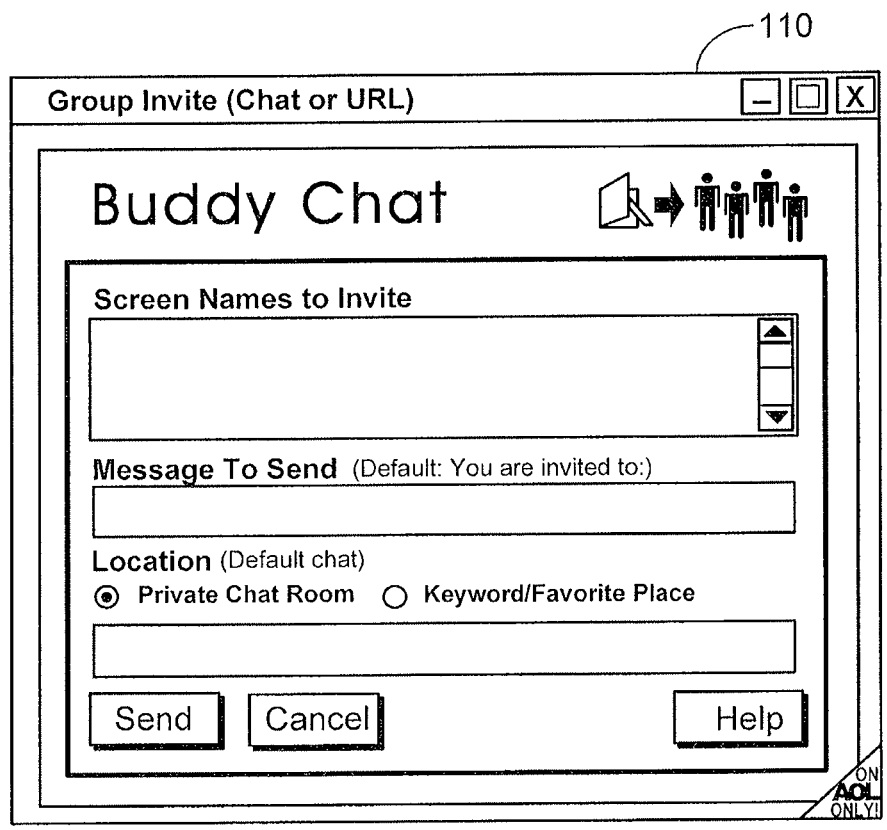
FIG. 10 is a graphical display of one implementation of the invention, showing a buddy chat window.

FIG. 10 is a graphical display of one implementation of the invention, showing a Buddy Chat window 110. As implemented on the AOL on-line system, the Buddy Chat function can be used to send an invitation to one or more co-users to a private "chat room" or a favorite place in the system. In the preferred embodiment, this function can be initiated by selecting a co-user name and activating the BUDDY CHAT button in the Buddy List window 40 (FIG. 3). The Buddy Chat window 110 is displayed, allowing the user to add additional names to the Screen Names to Invite field either manually or by selecting additional names from the Buddy List window 40 and again activating the BUDDY CHAT button. A message can be sent to each invitee via the Message to Rend field. In the preferred embodiment, an entire buddy list group can be added to the Buddy Chat window 110 by selecting a group name from the Buddy List window 40 and activating the BUDDY CHAT button or double-clicking.

To talk privately with the selected co-users, the user selects the Private Chat Room radio button and enters a "Buddy Chat Room Name" in the provided edit box. If the edit box is left blank, a Buddy Chat Room Name is automatically created for the user. Upon selecting Send, each selected co-user will receive a message inviting them to access and display a Buddy Chat Room (chat rooms are an existing feature of the AOL system).

To share those places a user likes best on the AOL system, the user selects the Keyword/Favorite Place radio button and enters a "Keyword" (i.e., a shortcut word defining an address) to a system site in the provided edit box, either manually or by using a "drag and drop" action from a list of the user's favorite places in the system. Upon selecting Send, each selected co-user will receive a message inviting them to access and display that online site.

Figure 11:
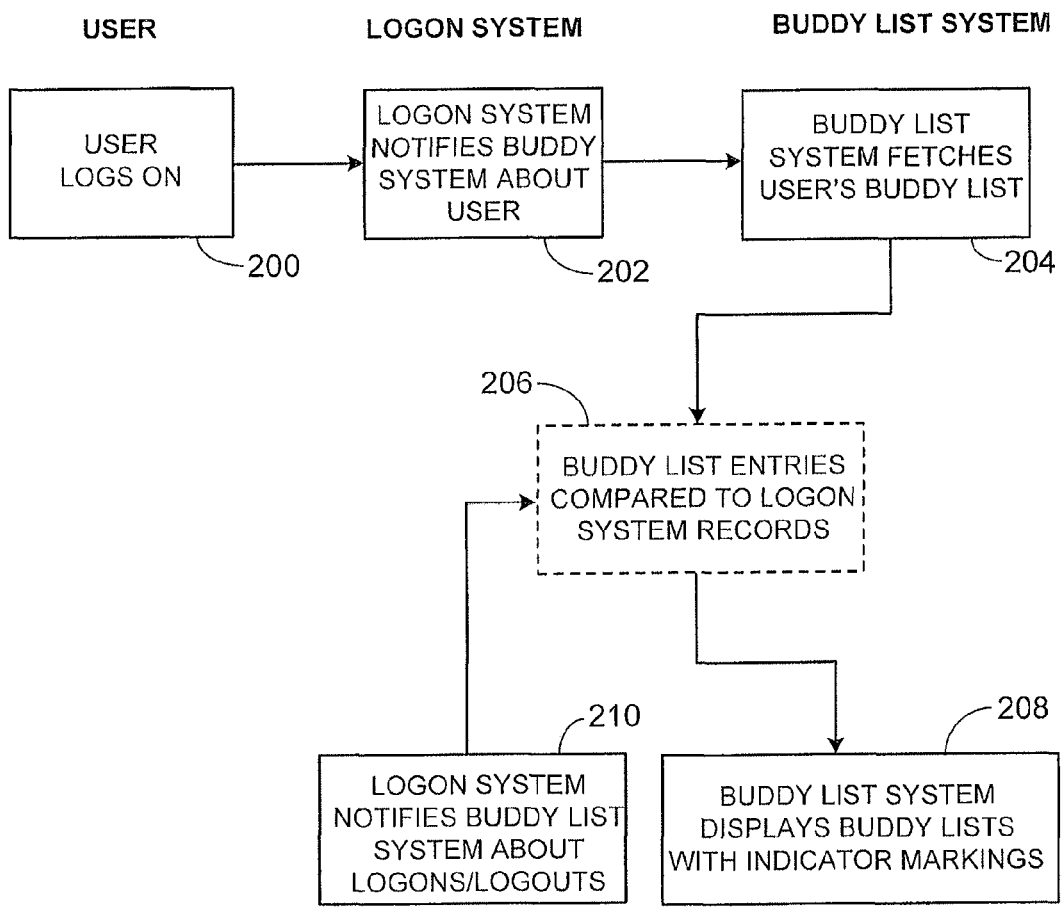
FIG. 11 is a flowchart showing an implementation of the invention.

FIG. 11 is a flowchart showing an implementation of the invention. A User logs in to a Logan System in conventional fashion (Step 200). The Logon System performs normal logon procedures (e.g., requesting a user ID and/or a password) and notifies the Buddy List System about the User (i.e., passes the User's ID, address, or screen name to the Buddy List System) (Step 202). The Buddy List System accesses that User's Buddy Lists from a database, which may be, for example, on the user's station 12 (Step 204). The entries in the User's Buddy Lists are then compared to the records of the Logan System (Step 206). This step is shown in dotted outline to indicate that the comparison can be done by passing records from the Logon System to the Buddy List System, or vice versa, or could be done a separate system. The Buddy List System then displays a Buddy List window showing the status (i.e., logged in or not) of the co-users on the User's Buddy Lists with any of various indicator markings (Step 208).

Thereafter, while the User's Buddy List window is open, the Logon System notifies the Buddy List System about new logons/logoffs of co-users (Step 210), causing a new compare of the User's Buddy List entries to the Logon System records (Step 206). Again, the compare may be performed anywhere. For example, the Logon System may maintain a copy of a User's Buddy Lists, and notify the Buddy List System only upon a logon status change for a co-user on the User's Buddy Lists. The Buddy List System then updates the indicated status of the displayed co-users (Step 208).

Software Implementation

The invention may be implemented in hardware or software, or a combination of both. However, preferably, the invention is implemented in computer programs executing on programmable computers each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium. configured with a computer program, where the storage medium so configured causes a computer to operate in a specific and predefined manner to perform the functions described herein.

A number of embodiments of the present invention have been described. Nevertheless, it will be understood that various modifications may be made without departing; from the spirit and scope of the invention. For example, while the preferred embodiment is event driven, meaning that updates to a buddy list are based on to change in the logon status of all co-users or of the selected co-users on a user's buddy list, updates can instead be performed on a periodic basis, where the buddy list system polls the logon system for logon status changes, or vice versa. Accordingly, it is to be understood that the invention is not to be limited by the specific illustrated embodiment, but only by the scope of the appended claims.

What is claimed is:

1. A method for permitting a user of an electronic network system to track the logon status of selected co-users of such system, comprising the steps of:
   (a) associating an identification list of selected co-users with the user;
   (b) accessing the user's identification list;
   (c) comparing the selected co-users on user's identification list to logon records for such selected co-users maintained by a logon system;
   (d) indicating to the user the logon status of the selected co-users on the user's identification list according to such logon records; and
   (e) repeating steps (c) and (d) under any of the following conditions:
      (1) periodically; or
      (2) after any change in the logon status of co-users of the system; or
      (3) after any change in the logon status of the selected co-users on the user's identification list;
      thereby tracking the logon status of selected co-users of such system.

2. The method of claim 1, wherein the step of comparing is performed by the logon system.

3. The method of claim 1, wherein the user's identification list is stored at least in part on the user's station.

4. The method of claim 1, wherein steps (b), (c), and (d) are initially performed when the user logs on to the system.

5. The method of claim 1, further including the step of permitting the user to selectively block which co-users can add the user to identification lists for such co-users.

6. The method of claim 5, wherein the user's block selections are stored in a permissions list, and the user's permissions list is stored at least in part on the user's station.

7. The method of claim 1, further including the step of permitting the user to transmit a communication to at least one co-user on the user's identification list having a logged on status.

8. A computer program, residing on a computer-readable medium, for permitting a user of an electronic network system to track the logon status of selected co-users of such system, and comprising instructions for causing a computer to:
   (a) associate an identification list of selected co-users with the user;
   (b) access the user's identification list;
   (c) compare the selected co-users on user's identification list to logon records for such selected co-users maintained by a logon system;
   (d) indicate to the user the logon status of the selected co-users on the user's identification list according to such logon records; and
   (e) repeat functions (c) and (d) under any of the following conditions:
      (1) periodically; or
      (2) after any change in the logon status of co-users of the system; or
      (3) after any change in the logon status of the selected co-users on the user's identification list;
      thereby tracking the logon status of selected co-users of such system.

9. The computer program of claim 8, wherein the compare is performed by the logon system.

10. The computer program of claim 8, wherein the user's identification list is stored at least in part on the user's station.

11. The computer program of claim 8, wherein functions (b), (c), and (d) are initially performed when the user logs on to the system.

12. The computer program of claim 8, wherein the instructions further cause the computer to permit the user to selectively block which co-users can add the user to identification lists for such co-users.

13. The computer program of claim 12, wherein the user's block selections are stored in a permissions list, and the user's permissions list is stored at least in part on the user's station.

14. The computer program of claim 8, wherein the instructions further cause the computer to permit the user to transmit a communication to at least one co-user on the user's identification list having a logged on status.

* * * * *